United States Patent [19]

Calminder

[11] 3,990,248

[45] Nov. 9, 1976

[54] INSTALLATION FOR THE STORAGE OF GAS, ESPECIALLY NATURAL GAS

[75] Inventor: Ake Calminder, Tumba, Sweden

[73] Assignees: WP-System AB, Sundsvall; ABV-Vagforbattringar AB, Stockholm, both of Sweden

[22] Filed: Feb. 26, 1975

[21] Appl. No.: 553,310

[30] Foreign Application Priority Data

Feb. 27, 1974 Sweden ............................. 7402590

[52] U.S. Cl. ....................................... 61/.5; 52/573; 62/45

[51] Int. Cl.[2] ...................... B65G 5/00; E21F 17/16

[58] Field of Search ....................... 61/.5, 46; 62/45; 52/573

[56] References Cited

UNITED STATES PATENTS

| | | | |
|---|---|---|---|
| 3,151,416 | 10/1964 | Eakin et al. | 61/.5 |
| 3,418,812 | 12/1968 | Kahn et al. | 61/.5 |
| 3,581,513 | 6/1971 | Cranmer et al. | 61/.5 X |
| 3,662,558 | 5/1972 | Jackson | 61/.5 |
| 3,692,205 | 9/1972 | Cowles et al. | 62/45 |
| 3,699,696 | 10/1972 | Rhoton | 62/45 |
| 3,736,754 | 6/1973 | Azalbert | 61/.5 |

*Primary Examiner*—Jacob Shapiro
*Attorney, Agent, or Firm*—Cushman, Darby & Cushman

[57] ABSTRACT

An installation for storing liquid gas, characterized by a storge cavity, of which all internal surfaces for enabling the storage of the gas in a liquid state, are coated with a continuous insulation, comprising a plurality of superposed layers of cold-resistant cellular or porous material, at least some of the internal layers at the side thereof turned toward the interior of the cavity, each having an adhering surface skin, and are provided with dilatation elements.

16 Claims, 3 Drawing Figures

INSTALLATION FOR THE STORAGE OF GAS, ESPECIALLY NATURAL GAS

The present invention relates to an installation for the storage of gas, especially natural gas.

The object of the invention is to solve the problems connected with the storage of liquid gas, especially liquid natural gas at temperatures below about −50° C, especially temperatures between −120° and −170° C. In particular the invention is directed to storing of gas in cavities located in rock.

The installation according to the invention is principally characterized by a storage cavity, of which the bottom, wall and top surfaces, for enabling the storage of the gas in a liquid state, are coated with an insulation, comprising a number of layers of cold-resistant, cellular or porous material, at least the internal ones of said layers at the side thereof facing the interior of the room having a surface skin, and dilatation elements.

Preferably, the insulation contains a plurality of layers of the cold-resistant material, each with a thickness in the range of 3 to 8 cm.

Due to the temperature reduction a considerable contraction will occur in an insulation consisting of, e.g., cellular polyurethane. This contraction is in the range of 1 cm per m. In order to allow such a contraction without dangerous tensile stresses occurring, it is suggested according to the invention to provide said dilatation elements. These dilatation elements can be obtained by providing the layers of cellular or porous material with an array of string shaped surface ribs or profiles. The same effect may be obtained by means of an array of grooves in the surface of the layers of cellular or porous material.

Preferably, the dilatation elements are provided in all the layers. The stresses in the plane of the coating will be absorbed as flexural stresses in the layers by virtue of said dilatation elements.

In order to secure that the insulation will still be sealing, if cracks should occur locally due to the tensile stresses, the layers of cellular or porous material are provided with a surface skin of a semi-hard material, e.g., semi-hard polyurethane with a thickness in the range of 0.5 to 2 mm.

Cracks may also be allowed to occur locally in the surface skin of the innermost layers. However, the forming of such cracks will inherently be confined to the innermost layers, due to the fact that the limit of break elongation of the materials will increase with the temperature, and the coefficient of elasticity will be reduced. The surface skins of the outer layers will thus remain intact due to the higher temperatures thereof.

At storage in rock a sealing of the rock wall may be necessary depending upon the type of rock. The construction of the insulation in such a case may be performed, e.g., in the following manner.

Initially the rock surface is injected by means of plastic, e.g., epoxy plastic. This process is performed by firstly drilling a number of relatively closely located holes into the rock to a depth of, e.g., 2 m. Thereafter, the epoxy plastic is injected under pressure into said holes.

Thereafter an approximately 0.5 mm thick sealing layer of epoxy plastic or polyurethane plastic of a semi-hard type is sprayed onto the sealed rock surface. By "semi-hard" should here be understood a hardness preferably in the range of 50° a 60° Shore $^{D}$ at the intended temperature of operation. When the surface is gelled but not cured, a layer of 3 to 8 cm thick cellular polyurethane plastic of a semi-hard type with cells as closed as possible is sprayed onto the surface. Simultaneously, the dilatation elements are applied onto the surface of said layer in the form of a pattern of bulges, ribs or grooves. The bulges or ribs may, e.g., be provided by spraying strings of the porous material onto the surface thereof. As an alternative soft profiles, e.g., corrugated profiles, may be fixed by being pressed into the still sticky layer.

Depending on the type of cellular plastic, the plastic proper will obtain a more or less thick surface skin (cellular plastic with a strong surface skin is usually defined as "integral cellular plastic" or usually "integral foam"). However, a thicker surface skin should normally be provided, which can be obtained directly in integral cellular plastic by means of a sheet-metal mould, which is, however, less suitable in the present connection. Instead the reinforced surface skin is obtained by means of spraying an urethane plastic of the same type as used in the sealing layer located adjacent the rock wall, whereby the surface skin could be made about 0.5 to 2 mm thick.

The first insulating layer, thus obtained, is then covered by a number of additional similar layers provided with surface skin and bulges or ribs in the manner described above. As many layers as required for the actual insulation are applied. For storing natural gas at −160° to −170° C (atmospheric pressure) a total insulation thickness of 20 a 30 cm might be required, consisting of four to six layers. The outer layers may be made without dilatation elements.

Of course, the cellular urethane plastic has been mentioned only as an example of materials, which may be included in the insulating layers. It might thus be replaced by another cellular plastic, which can resist the actual temperature without increased brittleness. It is likewise possible to utilize certain types of presently available porous elements, completed by, e.g. cellular urethane plastic layers on both sides. The porous elements can then conveniently be pressed into a newly sprayed cellular plastic layer.

By the system containing a plurality of insulating and sealing layers, and surface bulges, ribs or grooves in at least the inner layers, there is very little risk that the gas will migrate due to a possible occurring local crack, all the way out to the rock wall to cool it in a shock-like manner.

Depending on the nature of the rock the storage installation can be completed with various other arrangements in addition to the insulation. Examples thereof are arrangements for drainage, arrangements for the heating the rock located behind so as to avoid excessive cooling thereof, etcetera. The latter can be performed by means of inserted heating coils. In the bottom layer next to the rock a reinforcement may be required, to distribute any high stresses. An example of such reinforcement is, e.g., chopped synthetic fibre or glass fibre. A simple reinforcement can carry a fall-out of rock of 50 a 100 kg.

It is also possible to provide in the surface layer of the insulation a reinforcement with a corresponding purpose. Onto the surface layer plywood sheets may be applied as a protection for the underlying layers.

The invention may also be utilized in connection with storage in sheet-metal or concrete tanks of a construction known per se, on or below the ground level.

The invention will now be described more closely below with reference to the accompanying drawings, which illustrate an exemplary embodiment.

Figure 2:
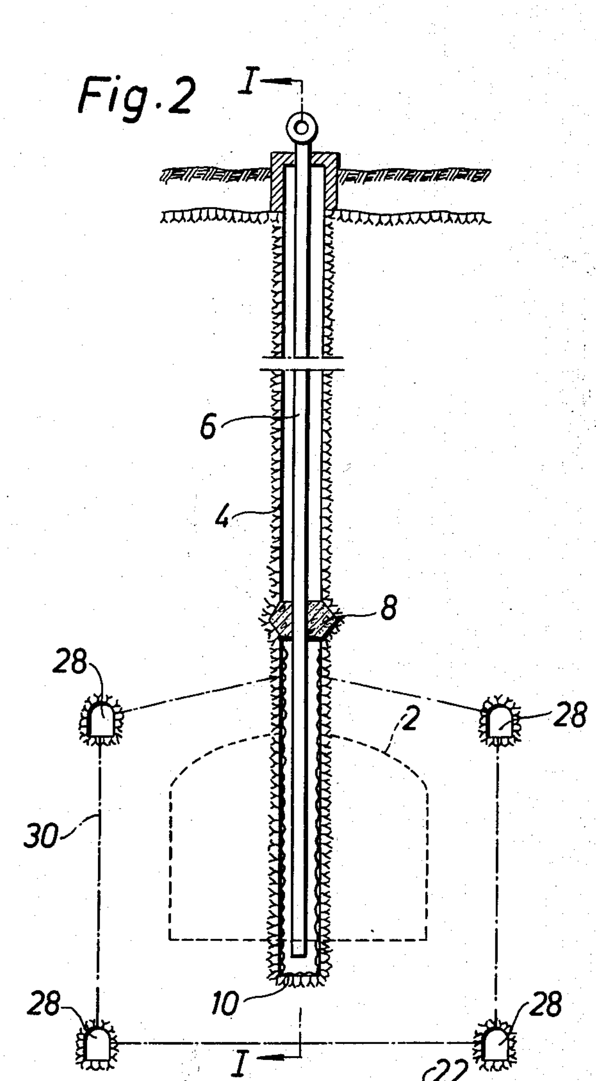
FIG. 2 is a cross section in the direction of arrows II—II in FIG. 1.

A rock cavity 2 is blasted by conventional techniques in the form of a horizontal tunnel, the cross-section of which is illustrated in FIG. 2. The rock cavity may, e.g. have a storage volume of 50,000 $m^3$, corresponding to a width of 20 m, a maximum height of 20 m and a length of 130 m.

The rock cavity is located at such a depth that the weight of the rock thereabove according to calculations by conventional methods will provide full safety against lifting of the rock at the maximum gas pressure which might occur in the rock cavity. In general a rock coverage of 20 m a 50 m will be sufficient From one end of the rock cavity a vertical shaft 4 extends up to the ground level. The vertical shaft 4 may have a cross section of 2m × 2m and is intended for filling and draining lines, indicated at 6, measuring instruments and measuring lines etcetera. The shaft is closed towards the rock cavity 2 by means of a concrete closing means 8, through which pipe inlets for the lines extend. In the bottom of the rock cavity, straight below the shaft, a pit 10 may be located for collecting the liquid gas.

Figure 3:
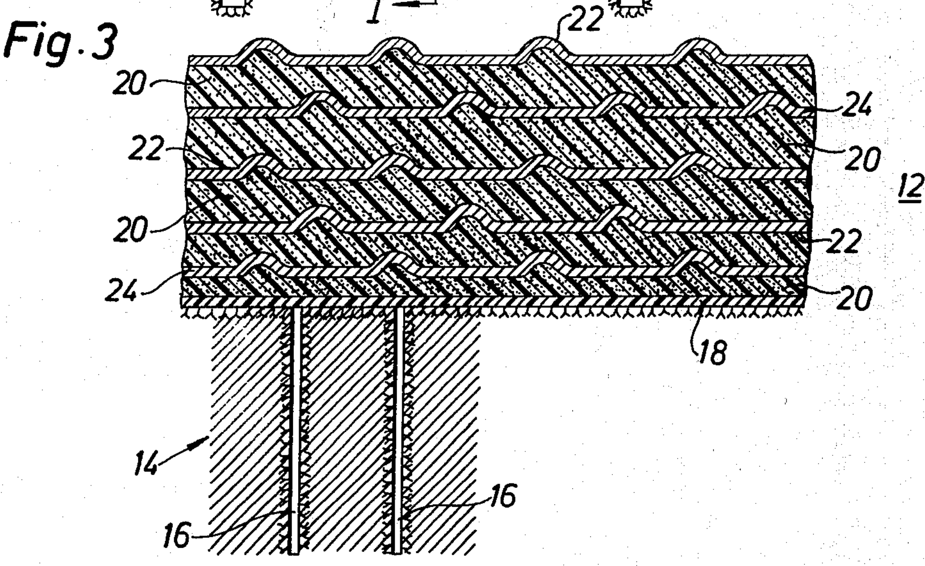
FIG. 3 is a cross-section at an enlarged scale through a small portion of the rock inner wall and the insulation located thereon in the installation according to FIGS. 1 and 2.

All rock and concrete surfaces in the rock cavity have an insulation, generally referenced 12, which is provided in the manner described above. This insulation is illustrated schematically and, for the sake of clarity, not according to scale, in FIG. 3. The rock surface is thus sealingly injected with epoxy plastic, indicated by dotted lines at 14, via relatively closely spaced bore holes 16. On the sealed rock surface a sealing layer 18 of epoxy plastic or an urethane plastic of a semi-hard type and with a thickness of about 0.5 mm is provided. On top of the sealing layer 18 a number of layers 20 of cellular urethane plastic are provided with a thickness of about 3 to 8 cm. The layers 20 in the surface thereof comprise a number of the dilatation elements mentioned above and referenced 22. The surface of the layers 20 also has a surface skin 24 with a thickness of about 0.5 to 2 mm. In the embodiment illustrated the insulation comprises in total 5 layers 20 of cellular urethane plastic with surface skin 24 and dilatation elements 22. The surface layer of the insulation may also have a protective layer of plywood sheets, not illustrated. A reinforcement, not shown, can also be provided in the bottom layer of the insulation, as described above.

The vertical shaft 4 may be filled with cellular plastic insulation or other insulation, e.g., insulation on a mineral basis, such as perlite or vermiculite.

Figure 1:
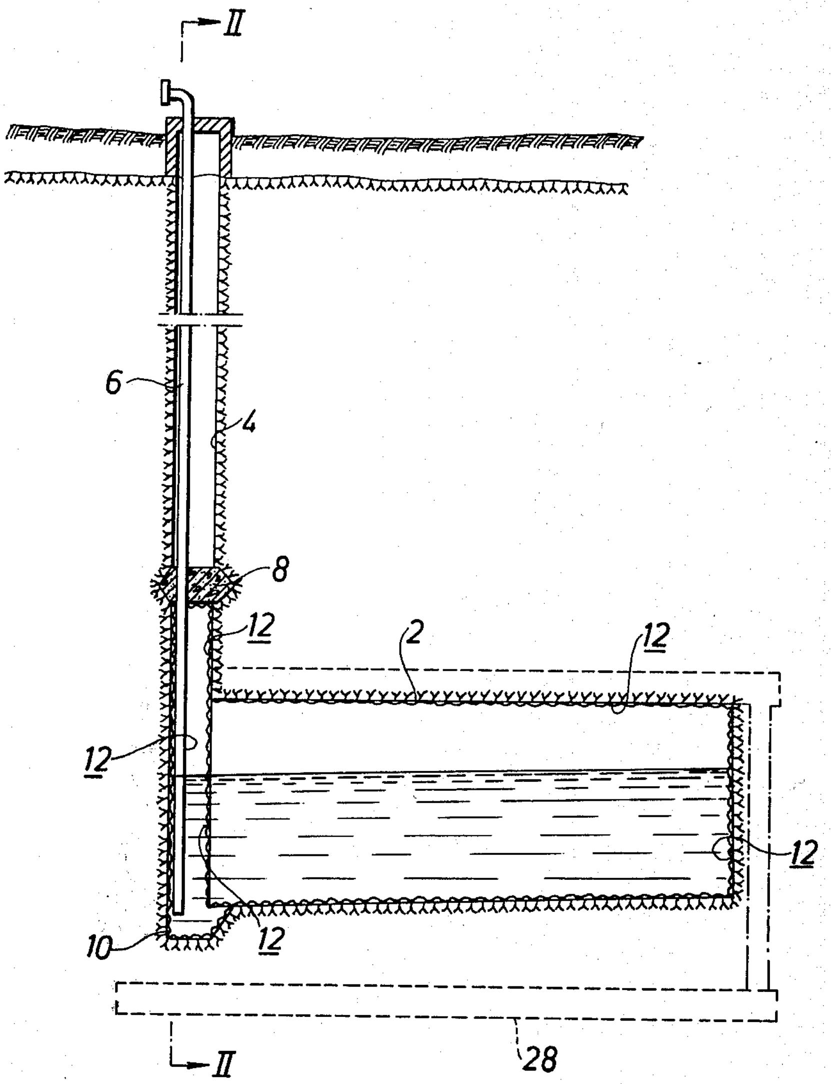
FIG. 1 is a longitudinal section in the direction of arrows I—I in FIG. 2 illustrating an installation for storing liquid natural gas.

The installation shown in FIG. 1 and 2 may also comprise means for heating the rock around the rock cavity. Said means comprises tunnels 28 blasted in the longitudinal direction of the rock cavity. Between said tunnels 28 bore hole curtains 30 extend, indicated by dash-dot lines, through which the heating of the rock adjacent the insulated cavity surfaces is performed by means, of, e.g., water of a convenient temperature.

The pressure and the temperature of the stored gas are selected so that a sufficient safety margin remains to the oritical temperature and pressure of the gas. For natural gas a temperature of, e.g., about −120° C may be selected, whereat the gas has a pressure of about 10 atmospheres. Hereby the self-pressure of the stored gas can be utilized for discharging it from the rock cavity. For ethene a storage temperature of about −90° C may be selected, as an example.

For extended storage of gas it might be suitable to circulate the stored gas through the refrigerating assembly located above ground, in order to maintain the storage temperature selected. It is also possible to provide refrigerating means directly in the storage cavity for the same purpose.

I claim:

1. An installation for storing liquid gas, particularly liquid natural gas, characterized by a storage cavity, of which all internal surfaces for enabling storage of the gas in a liquid state, are coated with a continuous insulation comprising a plurality of superposed layers of cold-resistant cellular or porous material, said layers adhering mutually so that tractive stresses in the main plane of the layers are transmitted between the layers, at least some of the internal layers at the face thereof turned toward the interior of the cavity each being provided with a pattern or array of dilatation elements and covered by a surface skin essentially impervious to stored liquid gas and adhering to said face and, except for innermost surface skin, to the underside of an overlying one of said layers.

2. An installation according to claim 1, characterized in that each layer has a thickness in the range of 3 to 8 cm.

3. An installation according to claim 1, characterized in that, for storing natural gas at about −160° to −170° C and at substantially atmospheric pressure, the insulation comprises four to six layers with a total thickness of appr. 20 to 30 cm.

4. An installation according to claim 1, characterized in that the dilatation elements include a pattern or array of string-shaped surface ribs or profiles.

5. An installation according to claim 1, characterized in that the dilatation elements include a pattern or array of grooves.

6. An installation according to claim 1, characterized by means for cooling the gas present in the cavity, so that it is maintained in a liquid state.

7. An installation according to claim 1, characterized in that the layers of cellular or porous material consist of cellular urethane plastic of a semi-hard type and that the surface skin is of semi-hard urethane plastic with a thickness in the range of 0.5 to 2 mm.

8. An installation according to claim 1, characterized in that the surface layer of the insulation facing the storage cavity has a reinforcement.

9. An installation according to claim 1, characterized in that the storage cavity is a rock cavity, the rock around the cavity being sealed by means of water-resistant injection material, which has been forced into cracks and voids located in the rock, and the insulation adjacent the rock wall comprising a layer of water-repellent priming material.

10. An installation according to claim 9, characterized in that the priming material has a thickness of 0.3 to 0.8 mm, preferably 0.5 mm.

11. An installation according to claim 9, characterized by means for temperature control of the rock around the storage cavity.

12. An installation according to claim 1, characterized in that the layers comprise cellular urethane plastic.

13. An installation according to claim 9, characterized in that the layer of priming material is selected from the group consisting of epoxy plastic or urethane plastic of a semi-hard type.

14. An installation according to claim 9, characterized in that the injection material is selected from the group consisting of epoxy plastic or urethane plastic.

15. An installation according to claim 13, characterized by means for heating the rock.

16. An installation according to claim 4, characterized in that said profiles are provided on the face of the corresponding layer by means of spraying techniques.

* * * * *